United States Patent
Beger et al.

(10) Patent No.: US 7,527,870 B2
(45) Date of Patent: May 5, 2009

(54) ORGANOSILOXANE COMPOSITIONS

(75) Inventors: Andrew Beger, Midland, MI (US); Timothy Lueder, Midland, MI (US); Nagambai Subramaniam, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 291 days.

(21) Appl. No.: 10/551,009

(22) PCT Filed: Mar. 16, 2004

(86) PCT No.: PCT/US2004/007873

§ 371 (c)(1),
(2), (4) Date: Sep. 27, 2005

(87) PCT Pub. No.: WO2004/094503

PCT Pub. Date: Nov. 4, 2004

(65) Prior Publication Data

US 2006/0194067 A1 Aug. 31, 2006

Related U.S. Application Data

(60) Provisional application No. 60/460,286, filed on Apr. 3, 2003.

(51) Int. Cl.
*B32B 25/00* (2006.01)
*C08L 83/04* (2006.01)
*C08G 77/14* (2006.01)

(52) U.S. Cl. .................. 428/447; 524/588; 528/17

(58) Field of Classification Search .................. 524/588
See application file for complete search history.

(56) References Cited

U.S. PATENT DOCUMENTS

| | | | | |
|---|---|---|---|---|
| 3,689,454 A * | 9/1972 | Smith et al. | .................. | 528/17 |
| 3,708,467 A * | 1/1973 | Smith et al. | .................. | 528/17 |
| 3,922,246 A * | 11/1975 | Ceyzeriat et al. | ............ | 523/212 |
| 4,143,088 A * | 3/1979 | Favre et al. | ................. | 525/477 |
| 4,552,919 A * | 11/1985 | Mikami et al. | .............. | 524/860 |
| 4,618,646 A | 10/1986 | Takago et al. | | |
| 4,683,251 A * | 7/1987 | Mikami | ....................... | 522/46 |
| 4,898,910 A * | 2/1990 | Kamis et al. | ................. | 524/860 |
| 5,264,603 A | 11/1993 | Altes et al. | | |
| 5,326,816 A | 7/1994 | Kinami et al. | | |
| 5,357,025 A | 10/1994 | Altes et al. | | |
| 5,403,881 A * | 4/1995 | Okawa et al. | ............... | 524/261 |
| 5,432,218 A * | 7/1995 | Mikami et al. | .............. | 524/262 |
| 5,545,704 A * | 8/1996 | Estes et al. | .................... | 528/15 |
| 5,665,805 A * | 9/1997 | Hatanaka et al. | ............ | 524/322 |
| 5,733,960 A | 3/1998 | Altes et al. | | |
| 5,840,794 A * | 11/1998 | Palmer | ....................... | 524/425 |
| 5,948,854 A * | 9/1999 | de Buyl et al. | .............. | 524/788 |
| 5,959,018 A * | 9/1999 | Miyake et al. | .............. | 524/425 |
| 5,985,371 A * | 11/1999 | Fujioka et al. | .............. | 427/387 |
| 6,008,284 A * | 12/1999 | Nylund et al. | .............. | 524/425 |
| 6,048,910 A * | 4/2000 | Furuya et al. | ................. | 522/86 |
| 6,107,435 A * | 8/2000 | Palmer et al. | ................. | 528/17 |
| 6,114,440 A * | 9/2000 | Yamaya et al. | .............. | 524/865 |
| 6,132,664 A * | 10/2000 | Freiberg et al. | ............. | 264/261 |
| 6,147,156 A * | 11/2000 | Yamaya et al. | .............. | 524/806 |
| 6,235,832 B1* | 5/2001 | Deng et al. | .................. | 524/525 |
| 6,288,152 B1* | 9/2001 | Okabe et al. | ................. | 524/205 |
| 6,676,740 B2* | 1/2004 | Matsumura et al. | ...... | 106/287.1 |
| 6,878,769 B2* | 4/2005 | Sakamoto et al. | ........... | 524/588 |
| 2003/0119975 A1* | 6/2003 | Fujiki et al. | ................. | 524/588 |

FOREIGN PATENT DOCUMENTS

EP 0 541 074 A2 5/1993
WO WO 01/42365 A1 6/2001

* cited by examiner

*Primary Examiner*—Randy Gulakowski
*Assistant Examiner*—Robert Loewe
(74) *Attorney, Agent, or Firm*—Catherine U. Brown

(57) ABSTRACT

A moisture curable composition capable of cure to an elastomeric body, the composition comprising (a) an organopolysiloxane having not less than two silicon-bonded hydroxyl or hydrolyzable groups; (b) a silane of the general formula $G_2\text{-Si}-R^1_2$, wherein each group is reactable with the hydroxyl or hydrolyzable groups in (a), and each $R^1$ group is an alkyl group having from 1 to 10 carbon atoms, an alkenyl group, an alkynyl group an aryl group or a fluorinated alkyl group; (c) one or more fillers and (d) a photocatalyst. Preferably at least one $R^1$ group is unsaturated, but in the absence of this there is provided an additional component in the form of (e) an unsaturated compound selected from the group of an unsaturated short chain siloxane, an unsaturated cyclic siloxane, an unsaturated fatty acid an unsaturated fatty alcohol or an unsaturated fatty acid ester. The cured product is generally used as a sealant, which avoids dirt pick-up after cure and has a protective layer on the sealant interface with air.

23 Claims, No Drawings

ORGANOSILOXANE COMPOSITIONS

CROSS REFERENCE TO RELATED APPLICATIONS

This application is a U.S. national stage filing under 35 U.S.C. §371 of PCT Application No. PCT/US2004/07873 filed on 16 Mar. 2004, currently pending, which claims the benefit of U.S. Provisional Patent Application No. 60/460,286 filed 3 Apr. 2003 under 35 U.S.C. § 119 (e). PCT Application No. PCT/US2004/07873 and U.S. Provisional Patent Application No. 60/460,286 are hereby incorporated by reference.

FIELD OF THE INVENTION

This invention is concerned with moisture curable organosiloxane compositions, which are curable to elastomeric solids and which avoid dirt pick-up after cure. The application also relates to the use of such compositions as sealing materials.

BACKGROUND OF THE INVENTION

Organosiloxane compositions, which cure to elastomeric solids, are well known. Typically, such compositions are obtained by mixing a polydiorganosiloxane having reactive terminal groups, generally silanol groups, with a silane cross-linking agent which is reactive with the polydiorganosiloxane, for example an acetoxy silane, an oximosilane, an aminosilane or an alkoxysilane. These materials are frequently curable upon exposure to atmospheric moisture at room temperature.

One important application of the above-described curable compositions is their use as sealants. In use as sealants, it is important that a composition is capable of curing in comparatively thick layers to provide an elastomeric body having a thickness greater than about 2 mm. It is frequently desirable that the composition cures quickly enough to provide a sound seal within several hours but not so quickly that the surface cannot be tooled to desired configuration shortly after application. Among specifically desirable attributes for such compositions are fast surface cure rate, good elasticity of the skin formed and lack of surface tackiness after curing for about 24 hours. End users are known to consider that a sealant with a residual surface tackiness has several drawbacks, for example, it may be thought that the product will not cure completely and thereby, may lead to the, typically incorrect, belief that such a problem also causes poor bulk properties. However, tacky surfaces are more prone to dirt pick up in a dusty environment such as in a factory. In addition, it has long been desired to have a sealant, which retains its color or translucency, and lack of color after curing and having a sealant surface at the sealant air interface which does not pick up dirt over time.

In order to achieve the desired speed of cure of hydroxy or hydrolysable polymers using alkoxysilane cross-linkers, it has become general practice to employ tri or tetra alkoxy silanes as cross-linkers in combination with organic tin or titanium compounds as condensation reaction catalysts. It is generally understood within the industry that a cross-linking agent must contain at least three reactable or cross-linkable groups so that the agent has the ability to link multiple chains together. Titanium compounds most generally preferred for this purpose are those derived from primary, secondary or tertiary alcohols, for example, isopropyl alcohol and n-butyl alcohol. The titanium compounds used are often employed in combination with a chelating agent such as an acetyl acetonate as an accelerator and stabilizer for the titanium compound.

The goal of providing a user with a cured end-product having minimal or no after cure dirt pick-up and/or staining has been the subject of a wide variety of patent publications. Hence, it will be appreciated that this is a long known problem recognized within the silicone sealant industry. As will be seen below a wide number of expensive and complex additives and compositions have been proposed to provide a "clean" sealant with minimal or no dirt pick up. In many of these cases the introduction of such additives, whilst providing a reduction in dirt pick-up, have other negative effects on the cured end-product such as staining and discoloration and as such a simple proven means of providing a "clean" sealant remains a goal of the sealant industry. The following prior art discusses previous attempts to solve this difficult and well known problem.

WO 01/42365 describes a silicone sealant composition having an organopolysiloxane comprising on average from greater than 1 to less than 2 reactive sites per molecule; a polyfunctional organosilicon comprising one or more hydrolysable groups per molecule and at least one functional group capable of reacting with the reactive sites of the polymer, a condensation cure catalyst and a filler. Typically the polymer reactive groups are silicon bonded hydrogen, hydroxyl or alkenyl groups and the organopolyfunctional organosilicon compound has the structure $R_4Si$ where at least one R group is hydrogen, alkoxy or alkenyl and at least one other R group is alkoxy, oximo, amino, aminoxy or acyloxy. However, whilst an enormous range of products fall within the scope of this definition, the standard compounds are specifically listed, i.e. preferred examples of the organopolyfunctional organosilicon compound include vinyltrimethoxysilane, tetramethoxysilane, methyltriethoxysilane, tetraethoxysilane, methyltrimethoxysilane or a mixture thereof This selection of silane based cross-linkers teaches the man skilled in the art that either 3 or 4 alkoxy groups are required for the invention. Furthermore, the catalyst can be any suitable condensation catalyst including tin, lead, antimony, iron, cadmium, barium, manganese, zinc, chromium, cobalt, nickel, aluminum, gallium or germanium as well as titanium and zirconium. The resulting sealant product is said to reduce staining.

U.S. Pat. No. 5,432,218 describes an organopolysiloxane having terminal silicon bonded hydroxyl or hydrolysable groups, a silicon containing cross-linker having at least two silicon bonded hydrolysable groups and the reaction product of an unsaturated fatty acid, such as tung oil, with a diorganopolysiloxane containing at least one silicon bonded amino, epoxy or hydroxyl group. These products give low dirt pick-up however products of these compositions tend to discolor, substantially due to the presence of the additives in the formulation.

U.S. Pat. No. 5,733,960 describes a means of increasing the longevity of low dirt pick-up type silicone sealant compositions by introducing zinc oxide into a composition containing an organopolysiloxane having silicon bonded hydroxyl or hydrolysable groups, a hydrolysable cross-lining agent, typically a ketoximosilane having at least 3 ketoximo groups per molecule, a tin or titanium based catalyst and tung oil.

U.S. Pat. No. 5,326,816 describes an organopolysilethylenesiloxane, organosilane having more than two hydrolysable groups, exemplified by a methyltributanoximo silane in combination with a UV absorber and/or an antioxidant. This composition is said to have good low dirt pick-up properties although the reason for the latter properties was unknown to the inventors.

EP 541074 A (Sunrise Meisei Corp) claims a 1-component sealant composition which uses a silicone-modified polyether together with a copolymer of at least two methacrylic esters in a solvent and a solid long chain primary or secondary saturated mono or di amine having a melting point of 40 to 100° C. in the same solvent. The latter two components are said to form a barrier layer on the sealant to reduce dirt pick up. The composition also contains a filler, an olefin, epoxy, methacryl, amino or mercapto functional silane cross-linker and a tin based catalyst.

U.S. Pat. No. 4,618,646 describes a sealant composition comprising a silanol terminated diorganopolysiloxane, a silane cross-linker having, on average, 2.01 hydrolysable groups per molecule, examples include methyltrimethoxysilane and vinyltris(N,N-diethylaminoxy)silane, silica fillers and silicone modified polyoxyalkylene compounds. The latter are provided to prevent sag.

U.S. Pat. No. 5,357,025 provides an elastomeric sealant composition, which is provided with a siloxaphobic surface layer (comprising a fluorocarbon compound) at the air sealant interface. The siloxaphobic surface layer comprises a fluorocarbon compound which contains per molecule at least one fluorocarbon group of the formula $C_xF_{(2x+1)}$ where x has an average value of at least 6; and (ii) a drying oil oxidation product. The siloxaphobic surface layer is said not to become dirty and prevents staining.

U.S. Pat. No. 5,264,603 describes a sealant composition, the preparation of which involves the mixing of a silanol terminated polydimethylsiloxane with a mixture of hydrolysable silanes. The resulting sealant is designed to produce a thin protective layer at the air sealant interface by incorporating a mixture of an at least 6 carbon fluorocarbon compound and a drying oil such as Tung oil.

It can be seen from the proposals above that previously there has been an understanding in the art that complex compositions involving a wide variety of additives are required to solve this problem. However, in some instances the additives used can have negative side effects on the resulting sealants, such as enhanced discoloration of the cured product. Hence, an inexpensive and simple means of obtaining a cured silicone sealant which does not pick up dirt is still being sought.

The present invention seeks to provide an improved "clean" sealant which provides the end-user with a modified surface avoiding dirt—pick up and which after curing is a translucent, "water white" or white cured product which avoids the aesthetically unpleasant yellowing discoloration issue.

DETAILED DESCRIPTION OF THE INVENTION

The present invention provides in a first aspect a moisture curable composition capable of cure to an elastomeric body, the composition comprising
a) An organopolysiloxane having not less than two silicon-bonded hydroxyl or hydrolysable groups
b) A silane substantially having the formula $G_2$-Si—$R^1_2$, wherein each group G is the same or different and is reactable with the hydroxyl or hydrolysable groups in (a), and each $R^1$ independently represents an alkyl group having from 1 to 10 carbon atoms, an alkenyl group, an alkynyl group, an aryl group such as phenyl, or a fluorinated alkyl group
c) one or more fillers and
d) a photocatalyst wherein, when no $R^1$ group is either an alkenyl or alkynyl group there is provided:—
e) an unsaturated compound selected from the group of an unsaturated short chain siloxane, an unsaturated cyclic siloxane, an unsaturated fatty acid, an unsaturated fatty alcohol and an unsaturated fatty acid ester.

In a composition according to the first aspect of the invention, component (a), the organopolysiloxane having not less than two silicon-bonded hydroxyl or hydrolysable groups, may have the general formula J-Q-J where Q is a polydiorganosiloxane chain having siloxane units of the formula $R^2_sSiO_{4-s/2}$ in which each $R^2$ independently represents an alkyl group having from 1 to 10 carbon atoms, an alkenyl group such as vinyl, propenyl and/or hexenyl groups; an aryl group such as phenyl, or a fluorinated alkyl group and s has a value of 0, 1 or 2. Preferred materials are linear materials i.e. s=2 for all units. Preferred materials have polydiorganosiloxane chains according to the general formula —$(R^2_2SiO)_m$— in which each $R^2$ represents an alkyl group, for example a methyl, ethyl or isobutyl group and m has a value from about 200 to about 1500. Suitable materials have viscosities of the order of about 500 mPa·s to about 200,000 mPa·s.

The groups J of the organopolysiloxane are hydroxyl or hydrolysable groups and may be the same or different. The J groups may be selected, for example, from —$Si(R^2)_2OH$, or

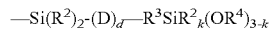

where D is —$R^3$—$(Si(R^2)_2—O)_r$—$Si(R^2)_2$— and $R^2$ is as aforesaid, (and is preferably methyl), $R^3$ is a divalent hydrocarbon group r is a whole number between 1 and 6 and d is 0 or a whole number, most preferably d is 0, 1 or 2, $R^4$ is an alkyl or oxyalkyl group in which the alkyl groups have up to 6 carbon atoms and k has the value 0, 1 or 2. Preferably, $R^3$ is either a methylene or ethylene group, k is 0 or 1 and $R^4$ is a methyl or ethyl group. Most preferably $R^3$ is an ethylene group, k is 0 and $R^4$ is an ethyl group. Preferably at least one J group is a —$Si(R^2)_2$-$(D)_d$—$R^3$—$SiR^2_k(OR^4)_{3-k}$ group. A small proportion of J groups may be $(alkyl)_3Si$— groups (where the alkyl groups are preferably methyl groups). Preferably, the organopolysiloxane (component (a)) will comprise from 32 to 70 weight % of the composition.

Component (b) is a silane substantially having the formula $G_2$-Si—$R^1_2$. Each group G may be the same or different and is reactable with the hydroxyl or hydrolysable groups. Examples of preferred G groups may be selected from the group of alkoxy, acetoxy, oxime and hydroxy groups. Most preferably the reactable groups are alkoxy groups containing between 1 and 10 carbon atoms such as methoxy, ethoxy, propoxy, isoproproxy, butoxy, and t-butoxy groups. Each $R^1$ group is the same or different and independently represents an alkyl group having from 1 to 10 carbon atoms, an alkenyl group, an alkynyl group an aryl group such as phenyl, or a fluorinated alkyl group. Preferably, at least one $R^1$ group is an alkenyl or alkynyl group but most preferably is an alkenyl group. The alkenyl group may for example be selected from a linear or branched alkenyl group such as vinyl, propenyl and hexenyl groups. Most preferably, one $R^1$ is an alkenyl group and the other $R^1$ group is an alkyl group having from 1 to 10 carbon atoms, such as methyl, ethyl or isopropyl. Specific examples of suitable silanes for component b in the present invention include, alkenyl alkyl dialkoxysilanes such as vinyl methyl dimethoxysilane, vinyl ethyldimethoxysilane, vinyl methyldiethoxysilane, vinylethyldiethoxysilane, alkenylalkyldioximosilanes such as vinyl methyl dioximosilane, vinyl ethyldioximosilane, vinyl methyldioximosilane, vinylethyldioximosilane, alkenylalkyldiacetoxysilanes such as vinyl methyl diacetoxysilane, vinyl ethyldiacetoxysilane, vinyl methyldiacetoxysilane, vinylethyldiacetoxysilane and alkenylalkyldihydroxysilanes such as vinyl methyl dihydroxysilane, vinyl ethyldihydroxysilane, vinyl methyldihydroxysilane, vinylethyldihydroxysilane.

A sufficient amount of component (b) is employed to ensure adequate stability of the composition during storage and adequate inter-reaction with component (a) of the composition when exposed to atmospheric moisture. Preferably component (b) will be present in a range of from 2 to 22 parts by weight per 100 parts by weight of component (a), i.e. it will typically comprise from 1.4 to 7.1 weight % of the composition. Preferably, component (b) contains from 0.2-7 parts by weight alkenyl content (typically vinyl group), and more preferably from 0.2 to 4 parts by weight alkenyl content. Most preferably, component (b) is present in an amount of from 4 to 10 parts by weight. Preferably, no silane cross-linkers having the formula $G_3$-Si—$R^1$ or $G_4$-Si, where G and $R^1$ are as hereinbefore described, are present in the composition of the present invention.

The one or more fillers (Component (c)) may comprise any one or more suitable fillers, which may be either reinforcing and/or non-reinforcing fillers or a combination thereof. Reinforcing fillers are usually of small particle size and typically are surface active in that they contain reactive groups on their outer surfaces. Examples of reinforcing fillers include fumed silica, calcined silica, precipitated silica, titania, zinc oxide, clay and mica all of which are used for imparting mechanical strength to the resulting cured products. Non-reinforcing fillers include ground calcium carbonate, magnesium carbonate, quartz, diatomaceous earth, barium sulphate, and calcium sulphate. It is also to be noted that some fillers, such as precipitated calcium carbonate, can be considered as semi-reinforcing in that they provide compositions with a degree of reinforcement. The fillers may be pretreated or treated in-situ with treating agents such as organochlorosilanes, organopolysiloxanes, and hexamethyldisilazanes or alternatively may be treated with fatty acids or their derivatives. Optionally the treating agent may contain a degree of unsaturation.

In the present invention whilst any of the above fillers may be utilized, precipitated calcium carbonates are preferred, particularly those treated with fatty acids or their derivatives. Preferably, component (c) will be present in the composition in a range of from 2 to 180 parts by weight, per 100 parts by weight of component (a) dependent on the filler used. In the case of calcium carbonate, for example, the amount of filler used will be in the range of from 40 to 180 parts by weight, per 100 parts by weight of component (a), i.e. it will be present in the region of from 28 to 60 weight % of the composition and in the case of silica based fillers the filler is more likely to be within the range of from 2 to 22 parts by weight, per 100 parts by weight of component (a).

The inventors have found that it is an essential feature of the present invention for there to be a photocatalyst (component (d)) present in the composition. Preferably, the photocatalyst is a titanate or zinc oxide, but most preferably is a titanate. The titanate is used to photocatalyse the formation of the protective layer on the sealant at the air-sealant interface but preferably also acts as a condensation catalyst to cure the composition in accordance with the present invention. It is believed that this is because of the ability of the titanate to act as a photocatalyst i.e. to initiate UV activated reactions, which are believed to be involved in the formation of the protective layer on the sealant at the air-sealant interface.

Any suitable titanate may be utilized in component (d) of the present invention, for example the titanate may comprise a compound according to the general formula Ti[$OR^5$]$_4$ where each $R^5$ may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of $R^5$ include but are not restricted to methyl, ethyl, propyl, isopropyl, butyl, tertiary butyl and a branched secondary alkyl group such as 2,4-dimethyl-3-pentyl. Preferably, when each $R^5$ is the same, $R^5$ is an isopropyl, branched secondary alkyl group or a tertiary alkyl group, in particular, tertiary butyl.

Alternatively, the titanate may be chelated. The chelation may be with any suitable chelating agent such as an alkyl acetylacetonate such as methyl or ethylacetylacetonate. The catalyst may therefore comprise a catalyst comprising a material selected from the group consisting of:
(I) a mixture, and
(II) a reaction product, of a compound selected from the group consisting of:
(i) $M(OR^6)_4$,
(ii) $M(OR^7)_y(Z)_z$ wherein M is a metal having a valency of 4 selected from Group IVB of the Periodic Table, each $R^6$ and $R^7$ is the same or different and is selected from the group consisting of
(i') primary aliphatic hydrocarbon groups,
(ii') secondary aliphatic hydrocarbon groups,
(iii') tertiary aliphatic hydrocarbon groups, and
(iv') —Si$R^8_3$, wherein each $R^8$ is an alkyl group having from 1 to 6 carbon atoms and Z is a group of the formula —O-L-O— wherein L is selected from the group consisting of:
(i") an alkylene group comprising from 1 to 8 carbon atoms and,
(ii") a branched alkylene radical comprising from 1 to 8 carbon atoms and y is 0 or 2, wherein when y is 0, z is 2 and when y is 2, z is 1; and
(iii") a compound having the general formula:

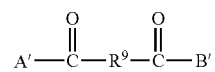

wherein $R^9$ is selected from the group consisting of:
a') a methylene radical and
b') substituted methylene radicals having from 1 to 6 carbon atoms, wherein A' is selected from the group consisting of:
(!) —$(CX_2)_nC(R^{10})_3$ wherein n is from 0 to 5,
(!!) an adamantyl group and
(!!!) an adamantyl derivative;

B' is selected from the group consisting of:
a") —$(CX_2)_tC(R^{10})_3$, wherein t has a value of from 0 to 5,
b") a monovalent alkyl group having from 1 to 6 carbon atoms, and
c") $OR^{11}$, wherein $R^{11}$ is selected from the group consisting of:
a'") —$(CX_2)_tC(R^{10})_3$ and
b'") a monovalent alkyl group having from 1 to 6 carbon atoms, wherein each X is the same or different and is selected from the group consisting of:
$a^i$) a halogen radical and
$a^{ii}$) hydrogen, and each $R^{10}$ is the same or different and is selected from the group consisting of:

b$^i$) a halogen radical and b$^{ii}$) an alkyl radical having one to eight carbon atoms b$^{iii}$) hydrogen Preferably the halogen radical is a fluoro radical.

These materials are produced, for example, by reacting an alcoholate as referred to above with an α- or β-diketone or a derivative thereof. More preferred are those partially chelated titanium compounds having two alcoholate groups attached to titanium. The most preferred organotitanium compounds are those wherein the two alcoholate groups are composed of more than 3 carbon atoms, for example, bis (diethyleneglycoxy)-titanium-(2,4-pentanedionate).

When Z is —O-L-O— each oxygen atom is bound directly to the titanium atom and x is about 2. Preferably L is an alkylene group containing 1 to 8 carbon atoms. Examples of the O-L-O group may include 1,3-dioxypropane (O—(CH$_2$)$_3$—O), 2,4-dimethyl-2,4-dioxypentane (O—C((CH$_3$)$_2$)—CH$_2$—C((CH$_3$)$_2$)—O) and 2,3-dimethyl-2,3-dioxybutane (O—C((CH$_3$)$_2$)—C—((CH$_3$)$_2$)—O)

Regarding now compound (ii), preferably at least one and most preferably each X is a halogen radical. Most preferably the halogen radical is a fluorine radical. Similarly it is preferred that at least one and most preferably each $R^{10}$ group is a halogen radical and most preferably it is a fluorine radical or each $R^{10}$ group is an alkyl group, most preferably a methyl or ethyl or butyl group. In a most preferred formulation n is zero. $R^9$ is most preferably a methylene group but can have one alkyl or halogen substituted alkyl group with 1 to 5 carbon atoms. The adamantyl group is a derivative of adamantane or tricyclo-3,3,1,1-decane which is a rigid ring system based on three fused cyclohexane rings.

Preferably B' is OR$^{11}$ where R$^{11}$ is a monovalent alkyl group having from 1 to 6 carbon atoms, most preferably R$^{11}$ is a methyl, ethyl or isopropyl group. When B' contains —(CX$_2$)$_t$C(R$^{10}$)$_3$, t is preferably 1 or 0, most preferably 0.

Examples of compound (iii'') include Methyl pivaloylacetate (MPA), Ethyl 4,4,4-trifluoroacetoacetate (TFA), Pentanoic acid 5,5,5,4,4-pentafluoro-3-oxoethyl ester, Dipivaloylmethane, Methyl-3-oxo-4,4-dimethylhexanoate and ethyl-3-(1-adamantyl)-3-oxopropionate. MPA is otherwise known as Pentanoic acid, 4,4-dimethyl-3-oxo-, methyl ester wherein each $R^{10}$ is a methyl group, n is zero, $R^9$ is a methylene group and B' is OR$^{11}$ where R$^{11}$ is a methyl group. MPA has the following formula:—

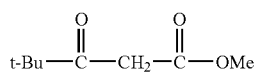

Ethyl 4,4,4-trifluoroacetoacetate (TFA) is otherwise known as Butanoic acid, 4,4,4-trifluoro-3-oxo-, ethyl ester and ethyltrifluoromethylacetoacetate wherein each $R^{10}$ is a fluoro group, n is zero, $R^9$ is a methylene group and B' is OR$^{11}$ where R$^{11}$ is an ethyl group. TFA has the following formula:

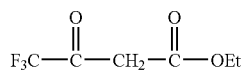

Pentanoic acid 5,5,5,4,4-pentafluoro-3-oxoethyl ester, hereafter referred to as ethylpentafluoroethylacetoacetate has the formula C$_2$F$_5$—C(=O)—CH$_2$—C(=O)—O—C$_2$H$_5$.

Dipivaloylmethane has the formula (CH$_3$)$_3$CC(=O)CH$_2$C(=O) C(CH$_3$)$_3$.

Methyl-3-oxo-4,4-dimethylhexanoate has the formula

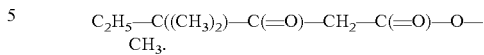

and ethyl-3-(1-adamantyl)-3-oxopropionate where A' is an adamantyl group, $R^9$ is a methylene group and B' is OR$^{11}$ where R$^{11}$ is an ethyl group.

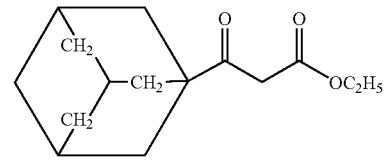

In the formulae above, Me represents a methyl group, Et represents an ethyl group, and t-Bu represents a tert-butyl group.

Hence, chelated titanate catalysts of component (d) may be depicted as follows:—

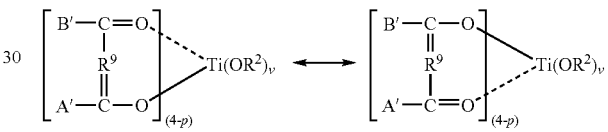

However it is to be understood that in most instances there will be present a mixture and/or reaction product of all different connotations of compounds (i) and (ii) including unreacted (i) and (ii) and the above from where p is 0 to p is 4.

Similarly when Z is —O-L-O— the reaction is preferably of the following tautomeric structure but typically will be a mixture and/or reaction product comprising all possible alternatives including unreacted compounds (i) and (ii)

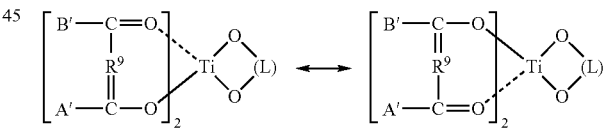

The molar ratio of compound (ii) to compound (i) is preferably no greater than 4:1, more preferably the ratio is between about 0.5:1 and 2:1, but most preferably it is in the region of 1:1.

Preferably component (d) will be present in an amount of from 0.3 to 6 parts by weight per 100 parts by weight of component (a), i.e. from about 0.2 to 2 weight % of the composition. Component (d) may be present in an amount of greater than 6 parts by weight in cases where chelating agents are used.

One or more an unsaturated compound selected from the group of an unsaturated short chain siloxane, an unsaturated cyclic siloxane, an unsaturated fatty acid an unsaturated fatty alcohol or an unsaturated fatty acid ester. The unsaturated compound(s) of Component (e) are generally only present when both $R^1$ groups in component (b) are alkyl groups. The most preferred unsaturated compound of component (e) is an unsaturated short chain siloxane (degree of polymerization (dp) from 2 to 50) organopolysiloxane. The unsaturated species is preferably a linear or branched alkenyl group such as vinyl, propenyl, hexenyl, but may alternatively be an alkynyl group. Unsaturated short chain siloxane may also contain two or more silicon bonded functional groups which are reactable with the hydroxy or hydrolysable groups of component (a) and which comprises at least one unsaturated group. When present the reactable groups may be alkoxy, acetoxy, oxime or hydroxy groups, most preferably the reactable groups are alkoxy groups containing between 1 and 10 carbon atoms such as methoxy, ethoxy, propoxy, isoproxy, butoxy and t-butoxy groups. Preferred examples of the unsaturated short chain siloxane include hydroxy, alkoxy, acetoxy or oximo-terminated alkenylalkyl siloxanes such hydroxy-terminated vinylmethylsiloxanes and alkoxy-terminated vinyl methyl siloxanes where the alkoxy group is preferably methoxy or ethoxy.

Alternative compounds which may be utilized in component (e) include, otherwise unreactive unsaturated siloxanes in which the each unsaturated species is/are preferably a linear or branched alkenyl group such as vinyl, propenyl, hexenyl, but may alternatively be an alkynyl group, a typical example being methyl alkenyl cyclic organopolysiloxanes. Further alternatives include, where chemically compatible with the composition to be used, unsaturated fatty acids, unsaturated fatty alcohols or unsaturated fatty acid esters such as, for example, oleyl alcohol. Component (e) may also be present when $R^1$ contains an unsaturated group but this is not essential and typically will be avoided. Typically, when present in the composition of the present invention, component (e) will be present in an amount of from 1 to 22 parts per 100 parts of component (a).

Preferably compositions in accordance with the present invention comprise:
- 100 parts by weight of component (a)
- from 2 to 22 parts by weight of component (b),
- from 2 to 180 parts by weight of component (c), and
- from 0.3 to 6 parts by weight of component (d)

Other ingredients, which may be included in the compositions, are pigments, plasticisers, condensation catalysts including tin, lead, antimony, iron, cadmium, barium, manganese, zinc, chromium, cobalt, nickel, aluminum, gallium or germanium and zirconium based condensation catalysts; photoinitiators, rheological additives for improving toolability of the composition, such as silicone glycols and adhesion promoters, for example, γ-aminopropyltriethoxysilane alone or in combination with γ-glycidoxypropyltrimethoxysilane. One conventional ingredient which can be employed as a plasticiser to reduce the modulus of the cured elastomer is a polydimethyl siloxane having terminal triorganosiloxy groups wherein the organic substituents are e.g. methyl, vinyl or phenyl or combinations thereof. Such polydimethylsiloxanes normally have a viscosity of from about 100 to about 100,000 mPa·s at 25° C. and can be employed in amounts up to about 80 parts per 100 parts by weight of the polymeric material. Alternative plasticisers may include organic plasticisers, which will be well known to the person skilled in the art such as petroleum distillates.

Also included within the scope of this invention are the cured elastomeric products of the said compositions and the use of such compositions for sealing joints, cavities and the like.

The moisture curable composition in accordance with the first aspect of the invention may prepared by mixing the constituents in any suitable order. For example a slurry of components (b) and (d) may be initially prepared, incorporating optional additives such as an adhesion promoter. The slurry may then be mixed with a proportion, typically between 40 and 75%, of the polymer (component (a)), before the addition of and mixing with the filler (component(c)) and subsequently the remainder of the polymer.

Compositions according to the invention are preferably formulated as one part formulations which are stable in storage but cure on exposure to atmospheric moisture, a major advantage over several prior art products. However, the composition may also be provided in two parts. The resulting sealant product may be employed in a variety of applications, for example as coating, caulking and encapsulating materials. They are, however, particularly suitable for sealing joints, cavities and other spaces in articles and structures which are subject to relative movement. They are thus particularly suitable as glazing sealants and for sealing building structures. They have desired cure properties to provide cured seals of modulus sufficiently low for most industry standards and elongation to break, which is sufficiently high for most industry standards.

In a further embodiment of the invention there is provided a method of forming an elastomeric mass between surfaces which is adherent to at least two such surfaces which method comprises introducing between the surfaces a mass of a moisture curable composition capable of cure to an elastomeric body, the composition comprising a) An organopolysiloxane having not less than two silicon-bonded hydroxyl or hydrolysable groups b) A silane substantially having the formula $G_2$-Si—$R^1_2$, wherein each group G is the same or different and is reactable with the hydroxyl or hydrolysable groups in (a), and each $R^1$ independently represents an alkyl group having from 1 to 10 carbon atoms, an alkenyl group, an alkynyl group an aryl group such as phenyl, or a fluorinated alkyl group c) one or more fillers and d) a photocatalyst selected from the group of a titanate and zinc oxide;

wherein, when no $R^1$ group is either an alkenyl or alkynyl group there is provided:— e) an unsaturated compound selected from the group of an unsaturated short chain siloxane, an unsaturated cyclic siloxane, an unsaturated fatty acid, an unsaturated fatty alcohol and an unsaturated fatty acid ester;

and curing said composition in the presence of moisture.

Preferably, the curing process occurs at about room temperature i.e. at a temperature in the region of from 15 to 25° C. but heating may be utilized to accelerate the curing process if desired. In the case of the present invention whilst the general curing of the composition in the presence of moisture occurs in minutes/hours, the formation of the protective layer as described in the present invention takes a few weeks to form but results in a surface which is smooth to the touch unlike traditional air-sealant interfaces which are comparatively tacky or sticky to the touch.

In order that the scope of the invention may become clearer there now follows a description of example sealant compositions selected for description to illustrate the invention by way of example. In the description all compositions are expressed by weight % and all viscosities are at 25° C. unless otherwise indicated.

EXAMPLES

Curing Conditions for All Samples

Slabs of approximately 100 mm thickness were cast and cured at a temperature of 20° C. under 50% relative humidity (RH) in the presence of fluorescent lighting.

Quantification of Surface Modification

Surface modification was quantified in the following examples by measuring the surface friction coefficient and/or gloss values of each sample. The state of cure and formation of the protective layer was reviewed periodically on the basis of touch and sight. Typically the first samples were assessed for testing after 21 days from initial curing and then every 7 days as required.

Gloss Values

The gloss measurements were made, in accordance with ASTM D 523, at an angle of 85° to the horizontal. Typical gloss/matt values for different finishes that are defined by the paints and coatings industry were also measured and are given below for reference:

| | |
|---|---|
| Flat | 4.50 |
| Satin | 16.67 |
| Semi-gloss | 47.13 |
| Gloss | 83.43 |

For the purpose of quantifying our samples, those which are surface modified are those having matt finish, which have a gloss value of below 45. Samples giving a gloss value of above 45 are interpreted as glossy and as such not surface modified.

Friction Test Method to Quantify Surface Modification

This method was used to determine differences in the surface resistance of different silicone surfaces, to the motion (or friction) of a given load block, in order to quantify the surface modification phenomenon using a. Monitor/Slip and Friction™ Model 32-06-00 tester (Testing Machines Inc.). The Friction coefficient of samples were determined by following the procedure described below and all results were measured in grams (g).

To determine the friction coefficient a load block (200 g) was pulled along the upper surface of a slab of cured sealant (at least 20 cm in length) at a speed of 6 inches per minute (15.24 cm per min.) for a distance of 8 inches (20.32 cm). Each test results in the determination of two quantities, the static and kinetic friction coefficients. The static coefficient is measured during the initial few seconds of the test, when the load block is stationary on the sealant surface. The kinetic friction coefficient is determined based on the force required to drag the load block. The kinetic friction coefficient accurately represents the resistance to motion due to the differences in the surface modification of the sealant surfaces tested.

In the case of kinetic friction coefficient results provided in the following examples, values up to 75 g of force are characteristic of surface-modified samples, and values in the range 150-300 g for samples that do not display surface modification.

Two alternative fillers were used in the following examples. They were both precipitated calcium carbonates which had been treated with a fatty acid, filler 1 had an average particle size of 0.075 µ, a specific gravity of 2.66 and a moisture content of 0.5% and filler 2 had an average particle size of 0.15 µ, a specific gravity of 2.7 and a moisture content of <0.2%.

EXAMPLES

Each composition (with the exception of Example 4c) was made in identical fashion as described in example 1A

Example 1

(To Illustrate the Absence of Surface Modification in the Absence of Vinyl (or More Generally an Unsaturated Species).

The following 2 formulations were made on a whip mixer by adding all the components and mixing thoroughly. In the case of Example 1 A a slurry of component (b), vinyl methyldimethoxysilane and component (d) diisopropoxytitanium bis(ethylacetoacetate) was mixed with 50% of component (a), trialkoxy-terminated polydimethylsiloxane. The mixture was mixed for 30 seconds and then filler was introduced into the resulting mixture. The filler was mixed into the composition for a minute subsequent to which the remainder of the polymer was introduced and the whole composition was mixed for a further minute. Finally, the resulting composition was devolatilised for a period of 30 seconds.

| | Wt % |
|---|---|
| A | |
| Trialkoxy-terminated polydimethylsiloxane (PDMS) (viscosity 65 000 mPa · s) | 59.12 |
| Filler 1 | 34.89 |
| Vinyl methyl dimethoxy silane (VMDM) | 4.99 |
| Diisopropoxytitanium bis(ethylacetoacetate) | 1.00 |
| | 100 |
| Friction | 63.78 g |
| Gloss | 22.62 |
| B (Comparative) | |
| Trialkoxy-terminated PDMS | 59.04 |
| Filler 1 | 35.01 |
| Dimethyldimethoxy silane (DMDM) | 4.96 |
| Diisopropoxytitanium bis(ethylacetoacetate) | 0.99 |
| | 100 |
| Friction | 258.5 g |
| Gloss | 82.74 |

Formulation A comprises of, among other components vinyl methyl dimethoxysilane. The most significant difference between the 2 formulations is that A contains ~1.02% vinyl species, whereas B does not have vinyl or any other unsaturated species. Formulation A was found to display a modified surface within 2-3 weeks after casting a slab of the material, whereas B does not show any noticeable surface modification even after 9 weeks.

Example 2

(To Illustrate the Surface Modification Effect with a Vinyl Siloxane Fluid Only)

The following formulation was made on a Hauschild (dental) mixer by adding all the components as described with respect to Example 1A with the exception that component (e) was introduced into the initial slurry with components (b) and (d).

| | Wt % |
|---|---|
| Trialkoxy-terminated PDMS (viscosity 65 000 mPa · s) | 46.27 |
| Filler 2 | 45.51 |
| Diethylenediaminepropyl dimethoxysilane | 0.20 |
| Tetra tertiary butyl titanate (TtBT) | 0.60 |
| methylacetoacetate (MAA) | 0.40 |
| DMDM | 4.02 |
| Hydroxy terminated Vinyl methyl siloxane fluid (viscosity 30 mPa · s) | 3.01 |
| | 100 |
| Friction | 53.5 g |
| Gloss | 10.26 |

This formulation contains ~0.93% vinyl derived from the vinyl methyl siloxanes which is the only source of unsaturation in the system. Surface modification was achieved within 2-3 weeks after casting a slab of the material for curing.

Example 3

(To Illustrate the Surface Modification Effect with an Unsaturated Species Other than Vinyl)

The following formulation was made on a Hauschild (dental) mixer by adding all the components mixer by adding all the components in the manner described with respect to Example 1A.

| | Wt % |
|---|---|
| Trialkoxy-terminated PDMS (viscosity 65 000 mPa · s) | 46.16 |
| Filler 2 | 45.52 |
| Diethylenediaminepropyl dimethoxysilane | 0.24 |
| TtBT | 0.61 |
| MAA | 0.40 |
| Acryloxypropylmethyl dimethoxy silane | 7.07 |
| | 100.00 |
| Friction | 69.33 g |
| Gloss | 28.92 |

This formulation contains acryloxypropyl methyl dimethoxy silane as the only source of unsaturation in the system. Surface modification was achieved after 6 weeks of casting a sample slab for curing.

Example 4

(To Illustrate the Delay in Surface Modification Effect with a Trifunctional System and Thereby the Preference for a Difunctional System)

Example 4a (Comparative)

The following formulation was made on a whip mixer by adding all the components in the manner described with respect to Example 1A.

| | Wt % |
|---|---|
| Trialkoxy-terminated PDMS | 58.86 |
| Filler 1 | 35.83 |

| | Wt % |
|---|---|
| VTM | 5.07 |
| Diisopropoxytitanium bis(ethylacetoacetate) | 0.24 |
| | 100.00 |
| Friction | 97.83 g |
| Gloss | 59.72 |

This formulation comprises of 5.07% vinyl trimethoxysilane (trifunctional cross-linker) instead of the difunctional VMDM. Although this sample contains ~0.93 % vinyl species, it took greater than 6 weeks for it to begin to display a modified surface. The longer time is thought to be due to the presence of the trifunctional silane that could potentially limit the mobility of the vinyl species that eventually lead to the surface modification effect.

Example 4b (Comparative)

A sample of Dow Corning® 9-1370 silicone sealant which uses a methyltrimethoxysilane cross-linking agent and a tertiary butyl titanate catalyst, was performed into a block and cured. However, it took a period of 9 weeks to achieve the following results: gloss 60.75 and friction values 172.5 grams.

Example 5 (Comparative)

(To Illustrate the Absence of Surface Modification Effect in the Absence of a Photocatalyst (Titanate in this Case))

The following formulation was made on a whip mixer by adding all the components in the manner described with respect to Example 1A.

| | Wt % |
|---|---|
| Trialkoxy-terminated PDMS (viscosity 65 000 mPa · s) | 59.16 |
| Filler 1 | 35.82 |
| VMDM | 5.01 |
| Dibutyltindiacetate | 0.02 |
| | 100 |
| Friction | 233.7 g |
| Gloss | 79.04 |

This formulation uses a tin-based catalyst instead of a titanate catalyst and contains ~1.02% vinyl species, but did not display a modified surface even after long periods of cure. This is due to the absence of a photocatalyst that is considered essential in promoting the reaction leading to the surface modification effect represented in the above examples. The titanate catalyst used in the other examples is an example of such a photocatalyst.

Example 6

(To Illustrate the Surface Modification Effect with a Hydroxy-Terminated PDMS)

The following formulation was made on a whip mixer by adding all the components in the manner described with respect to Example 1A.

|  | Wt % |
| --- | --- |
| OH-terminated polydimethyl siloxane (viscosity 50 000 cP) | 58.83 |
| Filler 1 | 35.16 |
| VTM | 1.54 |
| VMDM | 3.48 |
| Diisopropoxytitanium bis(ethylacetoacetate) | 1.00 |
|  | 100.00 |
| Friction | 61.37 g |
| Gloss | 8.18 |

The above formulation contains a hydroxy-terminated PDMS in place of the trialkoxy-terminated PDMS used in the other examples (~0.99% vinyl). Surface modification was achieved after 4 weeks of casting a slab of the sample for curing.

Example 7A (To Illustrate the Absence of Surface Modification Effect in the Absence of Light)

The following formulation (same as in Example 6) was made on a whip mixer by adding all the components in the manner described with respect to Example 1A. 2 slabs of the sample were cast and allowed to cure at 20° C./ 50% RH. One slab was allowed to cure on the lab countertop (under fluorescent lighting), and the other was placed in a dark cabinet.

|  | Wt % |
| --- | --- |
| Light Exposed |  |
| OH-terminated polydimethyl siloxane (viscosity 50 000 cP) | 58.83 |
| Filler 1 | 35.16 |
| VTM | 1.54 |
| VMDM | 3.48 |
| Diisopropoxytitanium bis(ethylacetoacetate) | 1.00 |
|  | 100.00 |
| Friction | 61.37 |
| Gloss | 8.18 |
| Dark Cabinet (Comparative) |  |
| OH-terminated polydimethyl siloxane (viscosity 50 000 cP) | 58.83 |
| Filler 1 | 35.16 |
| VTM | 1.54 |
| VMDM | 3.48 |
| Diisopropoxytitanium bis(ethylacetoacetate) | 1.00 |
|  | 100.00 |
| Friction | 292 g |
| Gloss | 88.2 |

The slab that was cured in the dark cabinet did not display surface modification as indicated by the high gloss value.

Example 7B (To Illustrate the Absence of Surface Modification Effect in the Absence of Light)

The following formulation (same as in Example 1A) was made on a whip mixer by adding all the components in the manner described with respect to Example 1A. 2 slabs of the sample were cast and allowed to cure at 20° C./50% RH. One slab was allowed to cure on the lab countertop (under fluorescent lighting), and the other was placed in a dark cabinet.

|  | Wt % |
| --- | --- |
| Light Exposed |  |
| Trialkoxy-terminated PDMS (viscosity 65 000 mPa · s) | 59.12 |
| Filler 1 | 34.89 |
| VMDM | 4.99 |
| Diisopropoxytitanium bis(ethylacetoacetate) | 1.00 |
|  | 100 |
| Friction | 63.78 |
| Gloss | 22.62 |
| Dark Cabinet (Comparative) |  |
| Trialkoxy-terminated PDMS (viscosity 65 000 mPa · s) | 59.12 |
| Filler 1 | 34.89 |
| VMDM | 4.99 |
| Diisopropoxytitanium bis(ethylacetoacetate) | 1.00 |
|  | 100 |
| Friction | 246.15 |
| Gloss | 84.55 |

The slab that was cured in the dark cabinet did not display surface modification as indicated by the high gloss value.

The invention claimed is:

1. An elastomeric product of a moisture cured composition, where the composition comprises:
   a) an organopolysiloxane having not less than two silicon-bonded hydroxy or hydrolysable groups;
   b) a silane substantially having the formula $G_2$—Si—$R^1{}_2$, wherein each group G is the same or different and is selected from the group consisting of alkoxy, acetoxy, oxime, and hydroxy groups, and each $R^1$ independently represents an alkyl group having from 1 to 10 carbon atoms, an alkenyl group, an alkenyl group an aryl group, or a fluorinated alkyl group;
   c) one or more fillers;
   d) a photocatalyst; and
   e) an unsaturated compound comprising an unsaturated organopolysiloxane having a degree of polymerization from 2 to 50 and at least two silicon bonded functional groups, which are reactable with the hydroxy or hydrolysable groups of component (a);
   wherein the elastomeric product has an air-sealant interface surface with a maximum gloss value of 45.

2. The elastomeric product of claim 1 wherein component (b) comprises one or more alkenyl alkyl dialkoxysilanes, alkenylalkyldioximosilanes, alkenylalkyldiacetoxysilanes, and/or alkenylalkyldihydroxysilanes.

3. The elastomeric product of claim 1 wherein component (b) is selected from the group consisting of vinyl methyl dimethoxysilane, vinyl ethyldimethoxysilane, vinyl methyldiethoxysilane, vinylethyldiethoxysilane, vinyl methyl dioximosilane, vinyl ethyldioximosilane, vinyl methyldioximosilane, vinylethyldioximosilane, vinyl methyl diacetoxysilane, vinyl ethyldiacetoxysilane, vinyl methyldiacetoxysilane, vinylethyldiacetoxysilane, vinyl methyl dihydroxysilane, vinyl ethyldihydroxysilane, vinyl methyldihydroxysilane and vinylethyldihydroxysilane.

4. The elastomeric product of claim 1 wherein component (c) comprises one or more of fumed silica, calcined silica, precipitated silica, titania, zinc oxide, clay, mica, ground calcium carbonate, precipitated calcium carbonate, magnesium carbonate, quartz, diatomaceous earth, barium sulphate, and calcium sulphate.

5. The elastomeric product of claim 4 wherein component (c) comprises a fatty acid treated precipitated calcium carbonate.

6. The elastomeric product of claim 1 wherein component (d) the photocatalyst is a titanate.

7. The elastomeric product of claim 6 wherein the titanate has the general formula $Ti[^5]_4$ where each $R^5$ may be the same or different and represents a monovalent, primary, secondary or tertiary aliphatic hydrocarbon group which may be linear or branched containing from 1 to 10 carbon atoms.

8. The elastomeric product of claim 7 wherein $R^5$ may be selected from the group of methyl, ethyl, propyl, isopropyl, butyl, tertiary butyl and 2,4-dimethyl-3-pentyl.

9. The elastomeric product of claim 1 wherein component (a) is a linear or substantially linear polydiorganosiloxane having terminal groups selected from $—Si(R^2)_2OH$, and $—Si(R^2)_2\text{-}(D)_d\text{-}R^3—SiR^2_k(OR^4)_{3-k}$;
where D is $—R^3—(Si(R^2)_2—O)_r—Si(R^2)_2—$, $R^2$ is selected from an alkyl group having from 1 to 6 carbon atoms, a vinyl group, a phenyl group and a fluorinated alkyl group, $R^3$ is a divalent hydrocarbon group r is a whole number between 1 and 6 and d is 0 or a whole number, $R^4$ is an alkyl or oxyalkyl group in which the alkyl groups have up to 6 carbon atoms and k has the value 0, 1 or 2.

10. The elastomeric product of claim 1, where the composition comprising:
    100 parts by weight of component (a)
    from 2 to 22 parts by weight of component (b),
    from 40 to 180 parts by weight of component (c), and
    from 0.3 to 6 parts by weight of component (d).

11. The cured sealant of claim 1, where component (b) contains from 0.2-7 parts by weight alkenyl content.

12. A method of forming an elastomeric mass between surfaces which is adherent to at least two such surfaces which method comprises:
    1) introducing between the surfaces a mass of a moisture curable composition comprising
        a) an organopolysiloxane having not less than two silicon-bonded hydroxyl or hydrolysable groups;
        b) a silane substantially having the formula $G_2\text{-Si}—R^1_2$, wherein each group G is the same or different and is selected from the group consisting of alkoxy, acetoxy, oxime, and hydroxy groups, and each $R^1$ independently represents an alkyl group having from 1 to 10 carbon atoms, an alkenyl group, an alkynyl group an aryl group, or a fluorinated alkyl group;
        c) one or more fillers;
        d) a photocatalyst; and
        e) an unsaturated compound comprising an unsaturated organopolysiloxane having a degree of polymerization from 2 to 50 and at least two silicon bonded functional groups, which are reactable with the hydroxy or hydrolysable groups of component a); and
    2) curing the composition in the presence of moisture and light to form the elastomeric mass, wherein the elastomeric mass has a maximum gloss value of 45.

13. The method of claim 12 wherein component (b) comprises one or more alkenyl alkyl dialkoxysilanes, alkenylalkyldioximosilanes, alkenylalkyldiacetoxysilanes, and/or alkenylalkyldihydroxysilanes.

14. The method product of claim 12 wherein component (b) is selected from the group consisting of vinyl methyl dimethoxysilane, vinyl ethyldimethoxysilane, vinyl methyldiethoxysilane, vinylethyldiethoxysilane, vinyl methyl dioximosilane, vinyl ethyldioximosilane, vinyl methyldioximosilane, vinylethyldioximosilane, vinyl methyl diacetoxysilane, vinyl ethyldiacetoxysilane, vinyl methyldiacetoxysilane, vinylethyldiacetoxysilane, vinyl methyl dihydroxysilane, vinyl ethyldihydroxysilane, vinyl methyldihydroxysilane and vinylethyldihydroxysilane.

15. The method of claim 12 wherein component (c) comprises one or more of fumed silica, calcined silica, precipitated silica, titania, zinc oxide, clay, mica, ground calcium carbonate, precipitated calcium carbonate, magnesium carbonate, quartz, diatomaceous earth, barium sulphate, and calcium sulphate.

16. The method of claim 12 wherein component (d) the photocatalyst is a titanate.

17. The method of claim 12 wherein component (a) is a linear or substantially linear polydiorganosiloxane having terminal groups selected from $—Si(R^2)_2OH$, and $—Si(R^2)_2\text{-}(D)_d\text{-}R^3—SiR^2_k(OR^4)_{3-k}$;
where D is $—R^3—(Si(R^2)_2—O)_r—Si(R^2)_2—$, $R^2$ is selected from an alkyl group having from 1 to 6 carbon atoms, a vinyl group, a phenyl group and a fluorinated alkyl group, $R^3$ is a divalent hydrocarbon group r is a whole number between 1 and 6 and d is 0 or a whole number, $R^4$ is an alkyl or oxyalkyl group in which the alkyl groups have up to 6 carbon atoms and k has the value 0, 1 or 2.

18. A moisture curable composition capable of cure to an elastomeric body, the composition comprising:
    (a) an organopolysiloxane having not less than two silicon-boned hydroxyl or hydrolysable groups:
    (b) a silane substantially having the formula $G_2\text{-Si}—R^1_2$, wherein each group G is the same or different and is selected from the group consisting of alkoxy, acetoxy, oxime, and hydroxy groups, and each $R^1$ independently represents an alkyl group having from 1 to 10 carbon atoms or a fluorinated alkyl group;
    (c) one or more fillers;
    (d) a photocatalyst consisting of a dialkoxy functional chelated titanate; and
    (e) an unsaturated compound, wherein component (e) comprises an unsaturated organopolysiloxane having a degree of polymerization from 2 to 50 and at least two silicon bonded functional groups, which are reactable with the hydroxy or hydrolysable groups of component (a).

19. An elastomeric product comprising the moisture cured composition in accordance with claim 18.

20. The composition of claim 18 wherein component (a) is a linear or substantially linear polydiorganosiloxane having terminal groups selected from $—Si(R^2)_2OH$, and $\text{-}Si(R^2)_2\text{-}(D)_d\text{-}R^3—SiR^2_k(OR^4)_{3-k}$;
where D is $—R^3(Si(R^2)_2—O)_r—Si(R^2)_2—$, $R^2$ is selected from an alkyl group having from 1 to 6 carbon atoms, a vinyl group, a phenyl group and a fluorinated alkyl group, $R^3$ is a divalent hydrocarbon group r is a whole number between 1 and 6 and d is 0 or a whole number, $R^4$ is an alkyl or oxyalkyl group in which the alkyl groups have up to 6 carbon atoms and k has the value 0, 1 or 2.

21. The composition of claim 18 wherein component (c) comprises one or more of fumed silica, calcined silica, precipitated silica, titania, zinc oxide, clay, mica, ground calcium carbonate, precipitated calcium carbonate, magnesium carbonate, quartz, diatomaceous earth, barium sulphate, and calcium sulphate.

22. The composition of claim 18 wherein component (c) comprises a fatty acid treated precipitated calcium carbonate.

23. The composition of claim 18, wherein the composition comprises:
100 parts by weight of component (a)
from 2 to 22 parts by weight of component (b),
from 40 to 180 parts by weight of component (c), and
from 0.3 to 6 parts by weight of component (d).

* * * * *